(No Model.)
T. R. CARSKADON.
SILO.
No. 310,378. Patented Jan. 6, 1885.
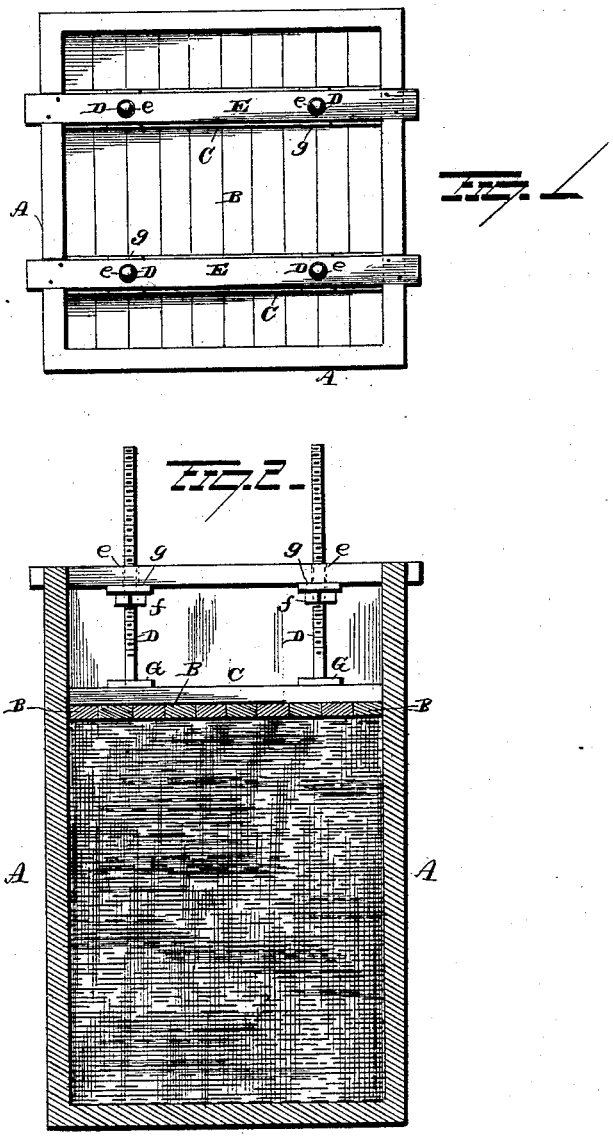
WITNESSES
INVENTOR

United States Patent Office.

THOMAS R. CARSKADON, OF KEYSER, WEST VIRGINIA.

SILO.

SPECIFICATION forming part of Letters Patent No. 310,378, dated January 6, 1885.

Application filed November 29, 1884. (No model.)

*To all whom it may concern:*

Be it known that I, THOMAS R. CARSKADON, of Keyser, in the county of Mineral and State of West Virginia, have invented certain new and useful Improvements in Silos for Preserving Fodder; and I do hereby declare the following to be a full, clear, and exact description of the invention, such as will enable others skilled in the art to which it appertains to make and use the same.

My invention relates to an improvement in silos for preserving fodder.

The great importance which ensilage has assumed during the past few years as a winter food for cattle, and particularly as a rich milk-producing food for cows, has naturally brought the subject of its preservation prominently before those interested. The method of digging pits, walling them up, and compressing the ensilage therein by means of heavy weights placed on the cover is crude, unhandy, and fails to exclude the air, which is necessary to perfect preservation. On the other hand, the silos constructed with costly mechanism for exerting pressure, such as rods secured to the bottom and attached to screws at the top, ratchet-bars located at the sides, and levers and pawls adapted to engage therewith, and heavy set-screws passing through the frame and engaging the central portion of the cover, are found too expensive for the farmer of small means, and therefore have but a limited use.

The object of my present invention is to provide a silo which can be constructed at slight expense and of any desired size or shape which its location may require, and which will effectually preserve the ensilage placed therein and admit of the same being conveniently removed therefrom.

With these ends in view my invention consists in certain features of construction and combinations of parts, as will be hereinafter described, and pointed out in the claims.

In the accompanying drawings, Figure 1 is a plan view of one form of the silo, and Fig. 2 is a vertical cross-section of the same.

A represents the side and end walls of the silo. They may be constructed of brick, stone, concrete, plank, or any material which is most convenient, and the shape of the silo may be square, oblong, circular, or other shape, as desired. The inside faces of the walls A should be smooth and vertical, in order that the cover may fit snugly against them and slide freely thereon. The cover is formed of a series of boards or planks, B, the edges of which are straight to admit of the plank resting in close contact with one another throughout their entire length and form, as nearly as possible, air-tight joints. Across the planks B, at suitable distances apart, planks or beams C are laid to receive the pressure from screws D. The cross-planks C may extend entirely across the silo or across a portion only of the planks B. Cross-beams E are firmly secured above the silo either by framing or otherwise securing them to the top of the silo, or they may be secured to posts, mason-work, or other firm support conveniently located and adapted to the purpose. Threaded bolts D, provided with nuts $f$, have bearings at different points on the cross-plank C, and extend upwardly through perforations $e$ in the cross-beams E. The beams E are provided with a suitable number of perforations to admit of changing the bolts D to different portions of the cover, and employing as many of these bolts as are found necessary, one of the important features of my invention being the adjustability of the several bolts in different positions on the cover, whereby the ensilage, which is never packed with uniform density throughout the entire silo, may receive a pressure at all parts of its surface which shall effectually exclude the air. Bearing plates, blocks, or posts G of the desired length are interposed between the heads of the bolts and the cross-planks C, and washers $g$ are interposed between the nuts $f$ and cross-beams E. When the silo is filled with ensilage and cover placed thereon, the cross-planks C are placed in position beneath the beams E, and the bolts passed through the perforations $e$ with their heads on the cross-planks C, or on the ends of the blocks or posts G, and nuts $f$ in position on the threaded portions of the bolts beneath the beams E, as shown in Fig. 2. By turning the nuts upwardly on the bolts the bolts are forced downwardly and the ensilage thereby compressed. If any portion of the ensilage be less compact than other portions, the bolt or bolts immediately above such portion or portions may be forced downwardly a greater distance than the others, and thus compress all portions alike.

The bolts suitable for the purpose above stated are quite inexpensive, and may be obtained or manufactured at any blacksmith-shop throughout the country, and the silo may be readily constructed by the farmer from material on his farm. Thus, while the silo, as above set forth, may be constructed at a very low cost, it has all the advantages of the more expensive and superior advantages to many of them.

Having fully described my invention, what I claim as new, and desire to secure by Letters Patent, is—

1. In a silo, the combination, with a suitable receptacle and a vertically-sliding cover, of a set of threaded bolts resting on the cover and passing upwardly through cross-beams, and movable nuts adapted to bear against the lower faces of the cross-beams and force the bolts downwardly, substantially as set forth.

2. In a silo, the combination, with a suitable receptacle and a flexible cover having a vertically-sliding motion thereon, of a set of screws resting on the cover, and means for forcing the screws downwardly independently of one another, for the purpose substantially as set forth.

3. In a silo, the combination, with a cover consisting of independent boards or planks, of cross plank or ties adapted to be arranged in different positions on the cover, independent screws resting on the cross plank or ties, and means for forcing the screws downwardly, substantially as set forth.

4. In a silo, the combination, with a receptacle provided with a sectional cover, of a set of independent screw-bolts resting in contact with the cover, and perforated cross-beams through which the screw-bolts pass, whereby the screw-bolts may be adjusted in different positions on the cover, and nuts bearing against washers in contact with the lower faces of the beams, for forcing the screws downwardly, substantially as set forth.

In testimony whereof I have signed this specification in the presence of two subscribing witnesses.

THOMAS R. CARSKADON.

Witnesses:
GEO. E. PRICE,
C. W. DAILEY.